3,226,226
Sn-Pb-In-Zn SOLDERS FOR GOLD AND
GOLD ALLOYS
Japnell D. Braun, Lewisburg, Ohio, assignor to Monsanto
Research Corporation, St. Louis, Mo., a corporation
of Delaware
No Drawing. Filed Sept. 3, 1963, Ser. No. 306,333
4 Claims. (Cl. 75—175)

This invention relates to new and improved solders. More particularly the invention relates to solders for uniting gold surfaces to each other and to other metals.

With the advent of intricate electronic devices, it has become important to plate the various components with gold and to employ gold or gold alloy wires to lower contact resistance. Much of the advantage of the gold wire or gold plate is lost when it becomes necessary to join gold surfaces or a gold surface to another metal using conventional solders.

One object of this invention is to provide new solders. A further object is to provide improved solders for use with gold surfaces. Another object is to provide improved joints between gold surfaces and surfaces of other metals.

These and other objects are attained by preparing a solder containing lead, tin, indium and zinc in critical proportions and using said solders to join gold surfaces to each other or to other metals.

The following examples are given in illustration and not as limitations on the scope of this invention. Where parts are mentioned they are parts by weight.

Example I

Place twenty-nine parts of lead, fifty-three parts of tin, 17.5 parts of indium and 0.5 part of zinc in a crucible, cover the metal with a thin layer of rosin flux and heat the crucible and contents until all components melt. Maintain the materials in molten condition with constant agitation until a homogeneous liquid is attained. Cool and remove the rosin flux. The product is a silvery alloy having a melting range of 122–156° C.

Example II

Join a gold (99.9% pure) wire having a diameter of 0.0015 inch at each end to a bronze electrode by standard soldering techniques. A strong tough bond is obtained.

The primary cause of failure of gold-solder bonds is due to migration of diffusion of the gold into the solder or reaction of the gold with the solder. Under normal operating conditions the reaction occurs slowly over an extended period of time resulting in a gradual impairment of the bond. To test the reactivity of the gold and the solder it is convenient to employ an accelerated aging test which consists of heating the gold-solder bond at 110° C. (well above normal operating conditions) followed by a metallographic assay using standard microscopic and electron probe techniques. The solder joint of Example II after 12 weeks of continuous heating at 110° C. shows on analysis approximately 60% of the gold unaffected. In contrast a solder containing 37.5 parts of lead, 37.5 parts of tin and 25 parts of indium reacts with 50% of the gold in 4 weeks and 80% in 16 weeks.

When the ternary system of lead, tin and indium is varied over a wide range and subjected to the accelerated test it is found that the composition containing 29 parts of lead, 53.5 parts of tin and 17.5 parts of indium is least reactive towards gold but still shows more than 50% reaction at 12 weeks.

The effect of the zinc addition is clearly shown when it is added to a ternary composition which is not quite as good as the optimum described above but which becomes acceptable on addition of zinc as set forth in Table I.

TABLE I

| Metal (parts by weight) | | | | Percent gold unaffected 12 weeks at 110° C. |
|---|---|---|---|---|
| Lead | Tin | Indium | Zinc | |
| 23 | 52 | 25 | | 22 |
| 23 | 52 | 25 | 1 | 52 |
| 23 | 51.5 | 25 | 0.5 | 46 |

Using the optimum ternary system but replacing small amounts of the lead with zinc, the results shown in Table II are obtained.

TABLE II

| Metal (parts by weight) | | | | Percent gold unaffected 12 weeks at 110° C. |
|---|---|---|---|---|
| Lead | Tin | Indium | Zinc | |
| 29 | 53.5 | 17.5 | | 26 |
| 29.25 | 53.0 | 17.5 | 0.25 | 51 |
| 29 | 53 | 17.5 | 0.50 | 61 |
| 28.75 | 53 | 17.5 | 0.75 | 60 |

The solders of this invention are quaternary systems containing lead, tin, indium and zinc. The amount of each component may be varied within narrow limits as follows:

| Metal: | Weight percent |
|---|---|
| Lead | 23–30 |
| Tin | 51–54 |
| Indium | 15–25 |
| Zinc | 0.1–1 |

They have a solidus temperature range of from 122–130° C. and a liquidus temperature range between 140 and 160° C.

The most critical component of these solders for use with gold surfaces is the zinc. Below 0.1 weight percent of zinc the reaction rate of the solder with gold is rapid even at ambient temperatures. Above 1 percent zinc, the working characteristics of the solder are less desirable for effective use with gold and particularly with sensitive gold plated electronic devices.

The solders are prepared by the conventional method of melting together a weighed mixture of the desired components in a suitable container such as a crucible. preferably, oxygen should be excluded from the mixture during the heating period by blanketing the mixture with an inert gas or a rosin flux. Conventional agitation is important in attaining homogeneity.

No particular soldering technique is required although due to the delicacy of electronic parts it is frequently desirable to perform the soldering operation in minimum time. This also reduces the possibility of oxide formation which partially reduces the strength of the bond and interferes with the electrical conductivity of the components.

The gold surfaces which can be joined successfully with themselves or with other metals may be pure gold or any of the alloys thereof in which the gold constitutes at least 50 weight percent. There are no restrictions on the other metal to be joined to the gold surface.

The solders are particularly useful in bonding gold surfaces together or to other metals. They are important in the electronic industry where gold plating of parts is essential for optimal electrical conditions but they are also useful in any situation requiring bonding of gold to other metals such as in the jewelry industry.

It is obvious that variations may be made in the products and processes of the invention without departing from the spirit and scope thereof as defined in the appended claims.

What is claimed is:
1. A solder consisting of an alloy consisting essentially of from 23–30 parts of lead, 51–54 parts of tin, 15–25 parts of indium and 0.1–1.0 part of zinc.
2. A solder consisting of an alloy of 29.25 parts of lead, 53 parts of tin, 17.5 parts of indium and 0.25 part of zinc.
3. A solder consisting of 29 parts of lead, 53 parts of tin, 17.5 parts of indium and 0.5 part of zinc.
4. A solder consisting of an alloy consisting essentially of 28.75 parts of lead, 53 parts of tin, 17.5 parts of indium and 0.75 part of zinc.

References Cited by the Examiner

UNITED STATES PATENTS

| | | | |
|---|---|---|---|
| 2,636,820 | 4/1953 | Bolton | 75—175 |
| 2,717,840 | 9/1955 | Bosch | 75—175 |

DAVID L. RECK, *Primary Examiner.*